US012732956B2

(12) United States Patent
Esswie

(10) Patent No.: US 12,732,956 B2
(45) Date of Patent: Sep. 8, 2026

(54) INTER-OPERATOR PAGING COORDINATION

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 18/360,560

(22) Filed: Jul. 27, 2023

(65) Prior Publication Data

US 2025/0039843 A1 Jan. 30, 2025

(51) Int. Cl.
*H04W 68/02* (2009.01)

(52) U.S. Cl.
CPC .................................. *H04W 68/02* (2013.01)

(58) Field of Classification Search
CPC ... H04W 60/005; H04W 68/02; H04W 68/12; H04W 8/183; H04W 88/06; H04W 92/20
See application file for complete search history.

(56) References Cited

U.S. PATENT DOCUMENTS

2022/0256501 A1 8/2022 Peng et al.
2023/0033096 A1 2/2023 Shaheen
2024/0129896 A1* 4/2024 Sureshsah ............ H04W 48/18

FOREIGN PATENT DOCUMENTS

EP 4 054 253 9/2022
WO 2022/216110 10/2022

OTHER PUBLICATIONS

International Search Report and Written Opinion for PCT Application No. PCT/US2023/036304 mailed Apr. 9, 2024, 16 pages.
Invitation to Pay Additional Fees for PCT Application No. PCT/US2023/036304 mailed Apr. 9, 2024, 16 pages.
International Search Report and Written Opinion for PCT Application No. PCT/US2023/036304 mailed Jul. 1, 2024, 27 pages.
Notification Concerning Transmittal of Copy of International Preliminary Report on Patentability mailed Feb. 5, 2026 for PCT Application No. PCT/US2023/036304, 19 pages.
European Office Action mailed Mar. 6, 2026 for European Patent Application No. 23817572.3, 3 pages.

* cited by examiner

*Primary Examiner* — Nader Bolourchi
(74) *Attorney, Agent, or Firm* — Amin, Turocy & Watson, LLP

(57) ABSTRACT

A user equipment may comprise multiple subscriber identity module profiles. The user equipment may indicate to a primary radio access network node capability to use the multiple profiles. The primary node may configure the user equipment with radio resource and radio functionality information usable to receive from the primary node a paging notification originated by a secondary radio access network node. The primary and secondary nodes coordinate to facilitate the secondary node transmitting a paging notification to the primary node and the primary node relaying the paging notification to the user equipment, while in idle mode with respect to the secondary node, according to profile information corresponding to the primary node. The user equipment avoids monitoring paging notifications according to profile information corresponding to the secondary node unless the user equipment has received a paging notification relayed from the primary node according to profile information corresponding to the primary node.

20 Claims, 12 Drawing Sheets

100
110
110
110
110
115
115
115
115
117
105
105
105
120
120
120
125
125
125
125
125
135
135
137
CORE NETWORK
130
140
145
145
INTERNET SERVICES
150

Figure 4:
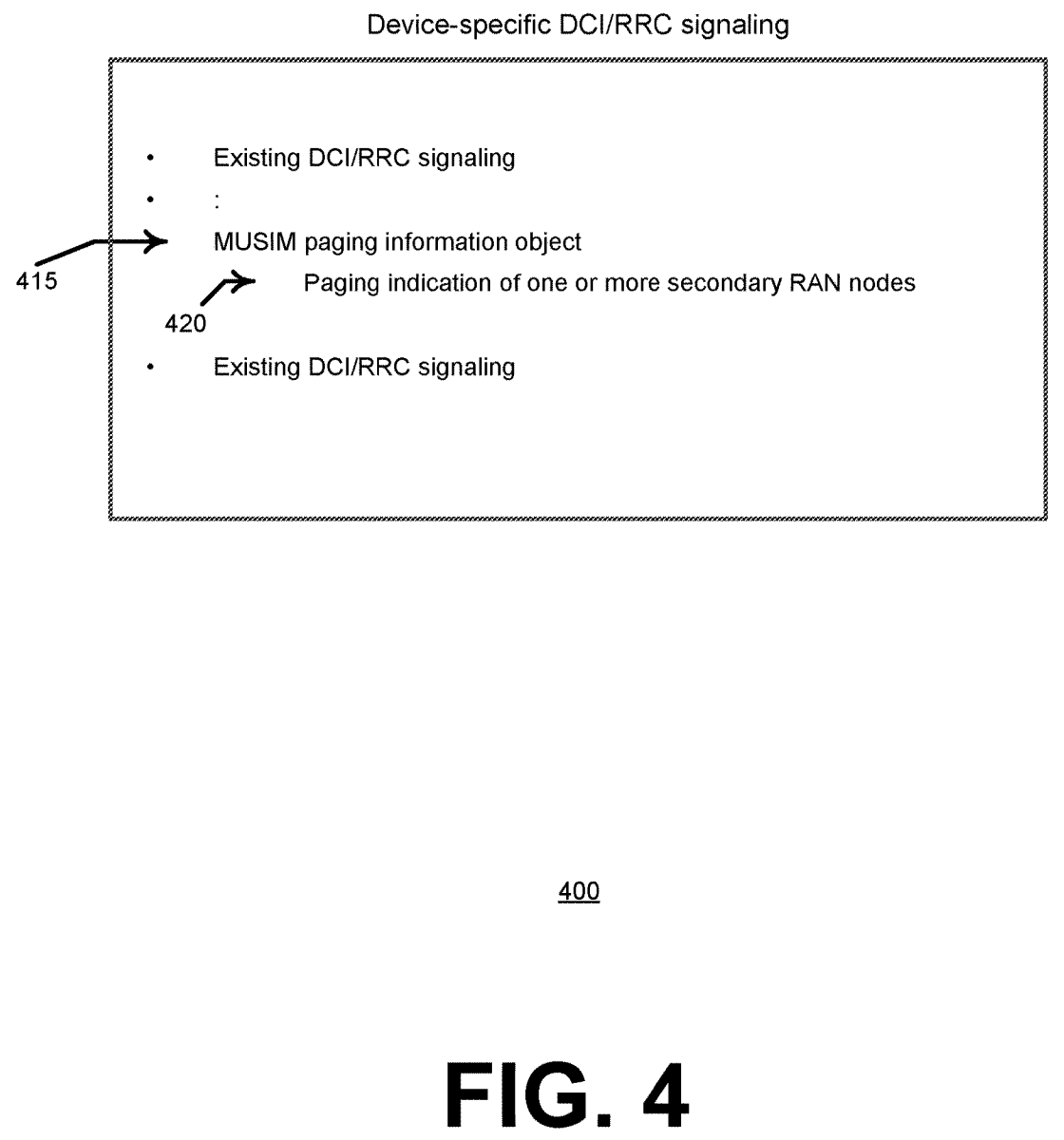

Device-specific DCI/RRC signaling

- Existing DCI/RRC signaling
- ..
- MUSIM paging information object
  - Paging indication of one or more secondary RAN nodes
- Existing DCI/RRC signaling

Figure 5:
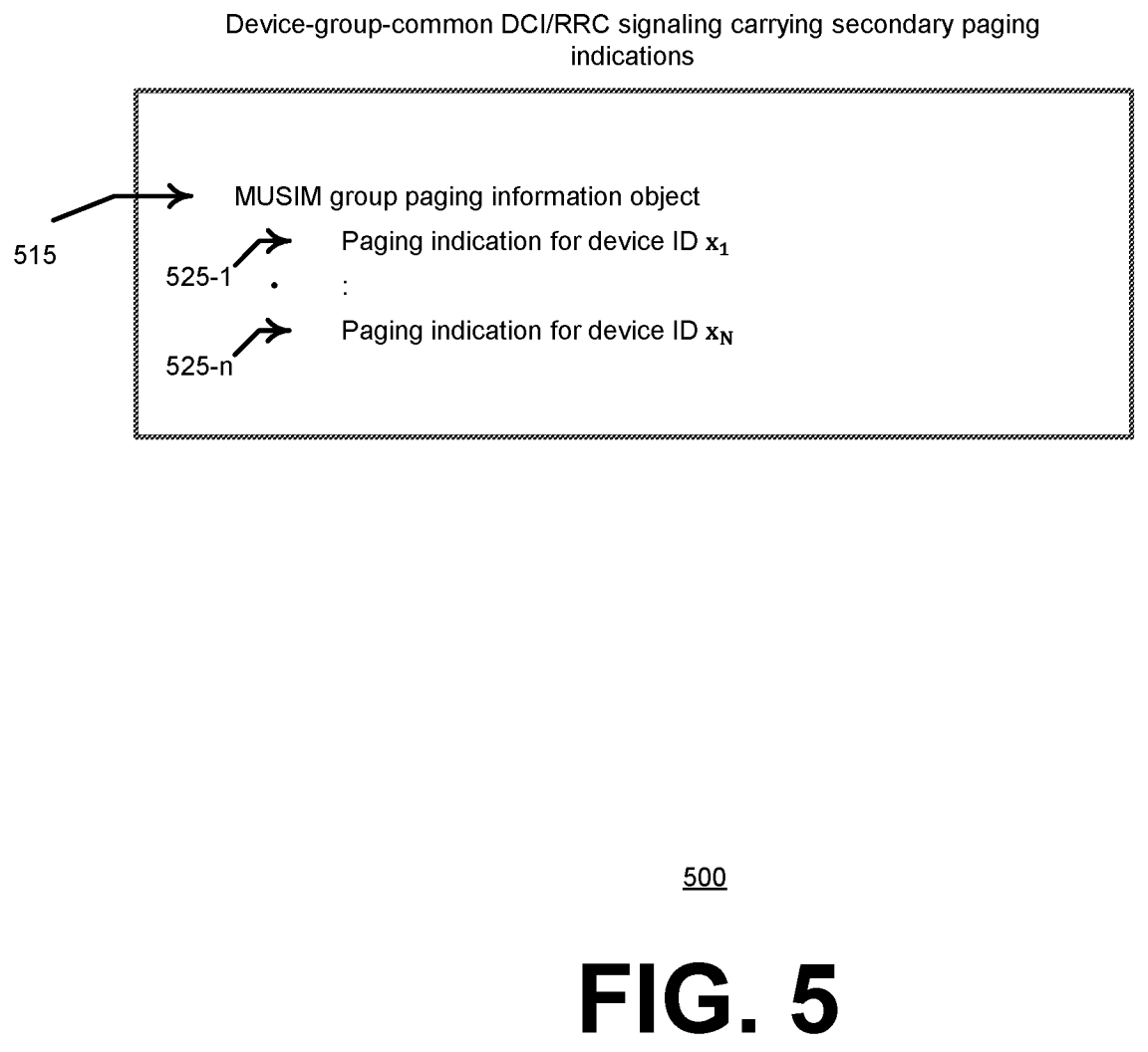

Device-group-common DCI/RRC signaling carrying secondary paging indications

515

MUSIM group paging information object 525-1

Paging indication for device ID $x_1$

:

525-n

Paging indication for device ID $x_N$

Figure 8:
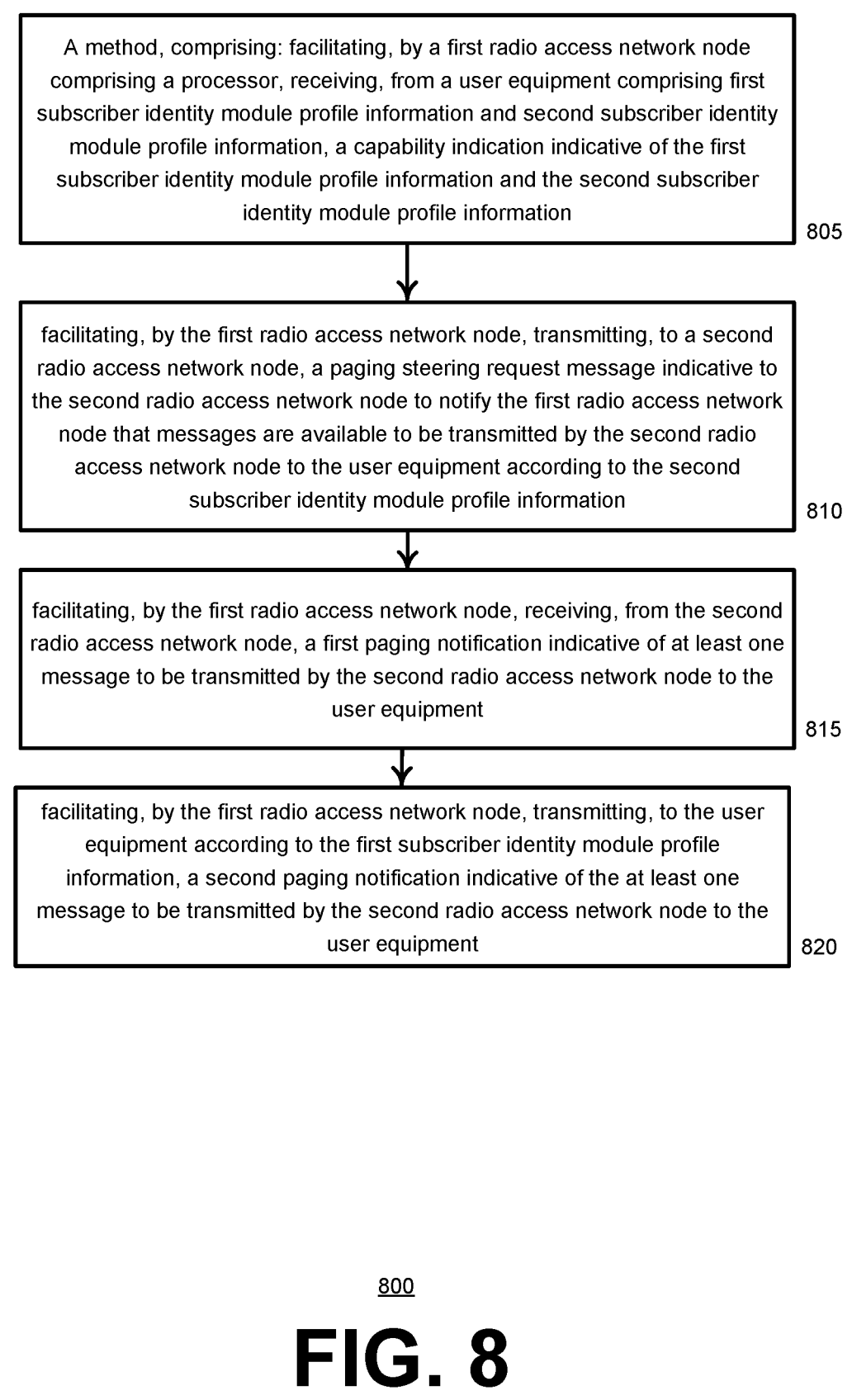

A method, comprising: facilitating, by a first radio access network node comprising a processor, receiving, from a user equipment comprising first subscriber identity module profile information and second subscriber identity module profile information, a capability indication indicative of the first subscriber identity module profile information and the second subscriber identity module profile information

805 facilitating, by the first radio access network node, transmitting, to a second radio access network node, a paging steering request message indicative to the second radio access network node to notify the first radio access network node that messages are available to be transmitted by the second radio access network node to the user equipment according to the second subscriber identity module profile information

810 facilitating, by the first radio access network node, receiving, from the second radio access network node, a first paging notification indicative of at least one message to be transmitted by the second radio access network node to the user equipment

815 facilitating, by the first radio access network node, transmitting, to the user equipment according to the first subscriber identity module profile information, a second paging notification indicative of the at least one message to be transmitted by the second radio access network node to the user equipment

Figure 9:
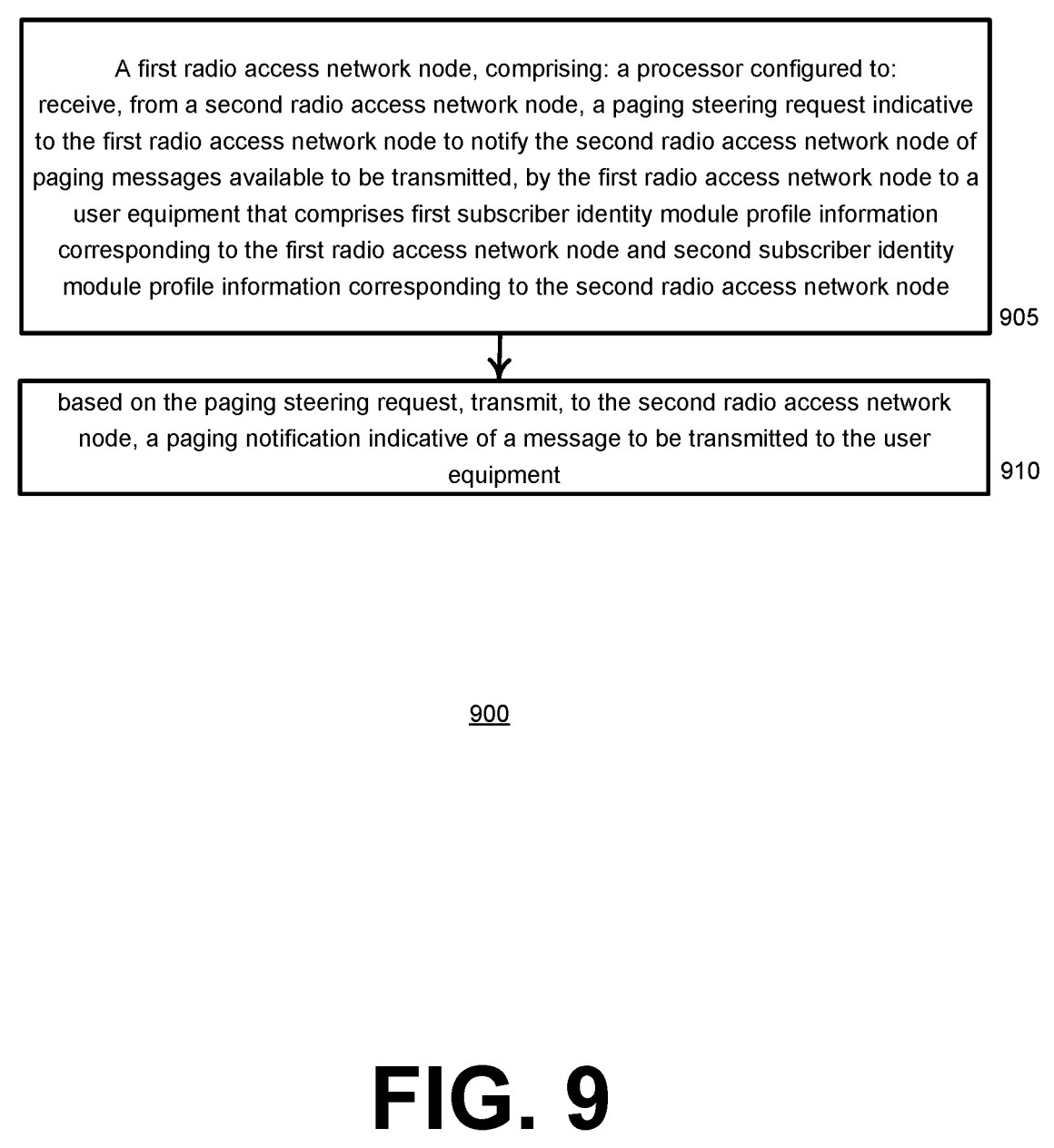

A first radio access network node, comprising: a processor configured to: receive, from a second radio access network node, a paging steering request indicative to the first radio access network node to notify the second radio access network node of paging messages available to be transmitted, by the first radio access network node to a user equipment that comprises first subscriber identity module profile information corresponding to the first radio access network node and second subscriber identity module profile information corresponding to the second radio access network node

905 based on the paging steering request, transmit, to the second radio access network node, a paging notification indicative of a message to be transmitted to the user equipment

INTER-OPERATOR PAGING COORDINATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional mobile broadband use cases supported by fourth generation mobile wireless communication systems ("4G") may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a first radio access network node comprising a processor, receiving, from a user equipment comprising first subscriber identity module profile information and second subscriber identity module profile information, a capability indication indicative of the first subscriber identity module profile information and the second subscriber identity module profile information. The method may further comprise facilitating, by the first radio access network node, transmitting, to a second radio access network node, a paging steering request message indicative to the second radio access network node to notify the first radio access network node that messages are available to be transmitted by the second radio access network node to the user equipment according to the second subscriber identity module profile information. The method may further comprise facilitating, by the first radio access network node, receiving, from the second radio access network node, a first paging notification indicative of at least one message to be transmitted by the second radio access network node to the user equipment. The method may further comprise facilitating, by the first radio access network node, transmitting, to the user equipment according to the first subscriber identity module profile information, a second paging notification indicative of the at least one message to be transmitted by the second radio access network node to the user equipment.

In an embodiment, the method may further comprise transmitting, to the user equipment, timing gap information corresponding to at least one timing gap usable by the user equipment to receive messages from the second radio access network node according to the second subscriber identity module profile information. In an embodiment, the method may further comprise scheduling, by the first radio access network node, first network resources usable by the user equipment during at least one of the at least one timing gap for traffic transmission between the first radio access network node and the user equipment according to the first subscriber identity module profile information.

In an embodiment, the second paging notification may comprise a timing gap change indication indicative to the user equipment to monitor, during a next available timing gap of the at least one timing gap, a paging resource corresponding to the second radio access network node according to the second subscriber identity module profile information.

In an embodiment, the method may further comprise avoiding, by the first radio access network node, scheduling first network resources to be usable by the user equipment during at least the next available timing gap of the at least one of the at least one timing gap for traffic transmission between the first radio access network node and the user equipment according to the first subscriber identity module profile information. Thus, the first network resources may not be scheduled for the user equipment to receive traffic from the first radio access network node according to SIM profile information corresponding to the first radio access network node.

In an embodiment, the second paging notification may be transmitted to the user equipment via a resource corresponding to the first radio access network node that is specified to be usable only by the user equipment.

In an embodiment, the user equipment may be a member of a group of user equipment, wherein the second paging notification is transmitted via a resource corresponding to the first radio access network node that is specified to be usable by at least two user equipment of the group of user equipment, and wherein the second paging notification comprises at least two user equipment identifiers respectively corresponding to the at least two user equipment. The at least two user equipment identifiers may comprise mask identifiers that are associated with at least two true user equipment identifiers respectively corresponding to the at least two user equipment.

In another example embodiment at first radio access network node may comprise a processor configured to receive, from a second radio access network node, a paging steering request indicative to the first radio access network node to notify the second radio access network node of paging messages available to be transmitted, by the first radio access network node to a user equipment that comprises first subscriber identity module profile information corresponding to the first radio access network node and second subscriber identity module profile information corresponding to the second radio access network node. Based on the paging steering request, the processor may be further configured to transmit, to the second radio access network node, a paging notification indicative of a message to be transmitted to the user equipment.

In an embodiment, the user equipment may be a first user equipment of a set of user equipment. The paging steering request may comprise a first user equipment identifier corresponding to the first user equipment and a second user equipment identifier corresponding to a second user equipment of the set of user equipment. The first user equipment identifier and the second user equipment identifier in the paging steering request may be indicative to the first radio access network node to notify the second radio access network node of paging messages available to be transmitted to the first user equipment or the second user equipment, respectively. The processor may be further configured to accept the paging steering request with respect to the first user equipment and to deny the paging steering request with respect to the second user equipment to result in a denied paging steering request.

In an embodiment, the denied paging steering request, or the denial of the paging steering request, may be based on at least one of: the second user equipment failing to have an active subscription, with respect to the first radio access network node, to a paging steering service; the second user equipment being associated with a privacy level; or a policy requirement that the second user equipment monitor paging resources corresponding to the first radio access network node to receive paging messages according to the first subscriber identity module profile information.

In an embodiment, the paging steering request may comprise a mask user equipment identifier, corresponding to the user equipment, indicative to the first radio access network node to notify the second radio access network node of paging messages available to be transmitted to the user equipment via the paging notification, wherein the paging steering request comprises the mask user equipment identifier. The paging message may comprise a non-mask user equipment identifier corresponding to the user equipment.

In yet another example embodiment, a non-transitory machine-readable medium may comprise executable instructions that, when executed by a processor of a server, facilitate performance of operations, comprising receiving, by a first radio access network node function, from a user equipment comprising first subscriber identity module profile information and second subscriber identity module profile information, a capability indication indicative of the first subscriber identity module profile information and the second subscriber identity module profile information. Based on the second subscriber identity module profile information, the operations may further comprise, transmitting, to a second radio access network node function, a paging steering request message indicative to the second radio access network node function to notify the first radio access network node function of paging notifications to be transmitted by the second radio access network node function to the user equipment. The operations may further comprise receiving, by the first radio access network node function from the second radio access network node function, a first paging notification indicative of traffic to be transmitted by the second radio access network node function to the user equipment. The operations may further comprise transmitting, by the first radio access network node function to the user equipment according to the first subscriber identity module profile information, a second paging notification indicative of the traffic to be transmitted by the second radio access network node function to the user equipment.

In an embodiment, the operations may further comprise transmitting, to the user equipment, timing gap information corresponding to at least one timing gap usable by the user equipment to receive traffic from the second radio access network node function according to the second subscriber identity module profile information.

In an embodiment, the operations may further comprise scheduling, by the first radio access network node function, a first network resource usable by the user equipment during at least one of the at least one timing gap to receive traffic from the first radio access network node function according to the first subscriber identity module profile information.

In an embodiment, the second paging notification may comprise a timing gap change indication indicative to the user equipment to monitor, during a next available timing gap of the at least one timing gap, a second network resource corresponding to the second radio access network node according to the second subscriber identity module profile information. The next available timing gap may occur after the first paging notification is received from the second radio access network node function.

In an embodiment, the operations further may further comprise avoiding, by the first radio access network node function, scheduling the first network resource to be usable by the user equipment during at least the next available timing gap of the at least one of the at least one timing gap for traffic transmission between the first radio access network node and the user equipment according to the first subscriber identity module profile information.

In an embodiment, the first radio access network node function may correspond to a first radio access network, and the second radio access network node function may correspond to a second radio access network. The first radio access network may correspond to a first network operator. The second radio access network may correspond to a second network operator. The first network operator and the second network operator may be different network operators.

BRIEF DESCRIPTION OF THE DRAWINGS

FIG. 4 illustrates an example device-specific relayed paging indication.

FIG. 5 illustrates an example group-common relayed paging indication.

FIG. 6 illustrates a timing diagram of an example method of inter-operator paging steering.

FIG. 8 illustrates a block diagram of an example method.

FIG. 9 illustrates a block diagram of an example radio access network node.

FIG. 10 illustrates a block diagram of an example non-transitory machine-readable medium.

DETAILED DESCRIPTION OF THE DRAWINGS

Figure 1:
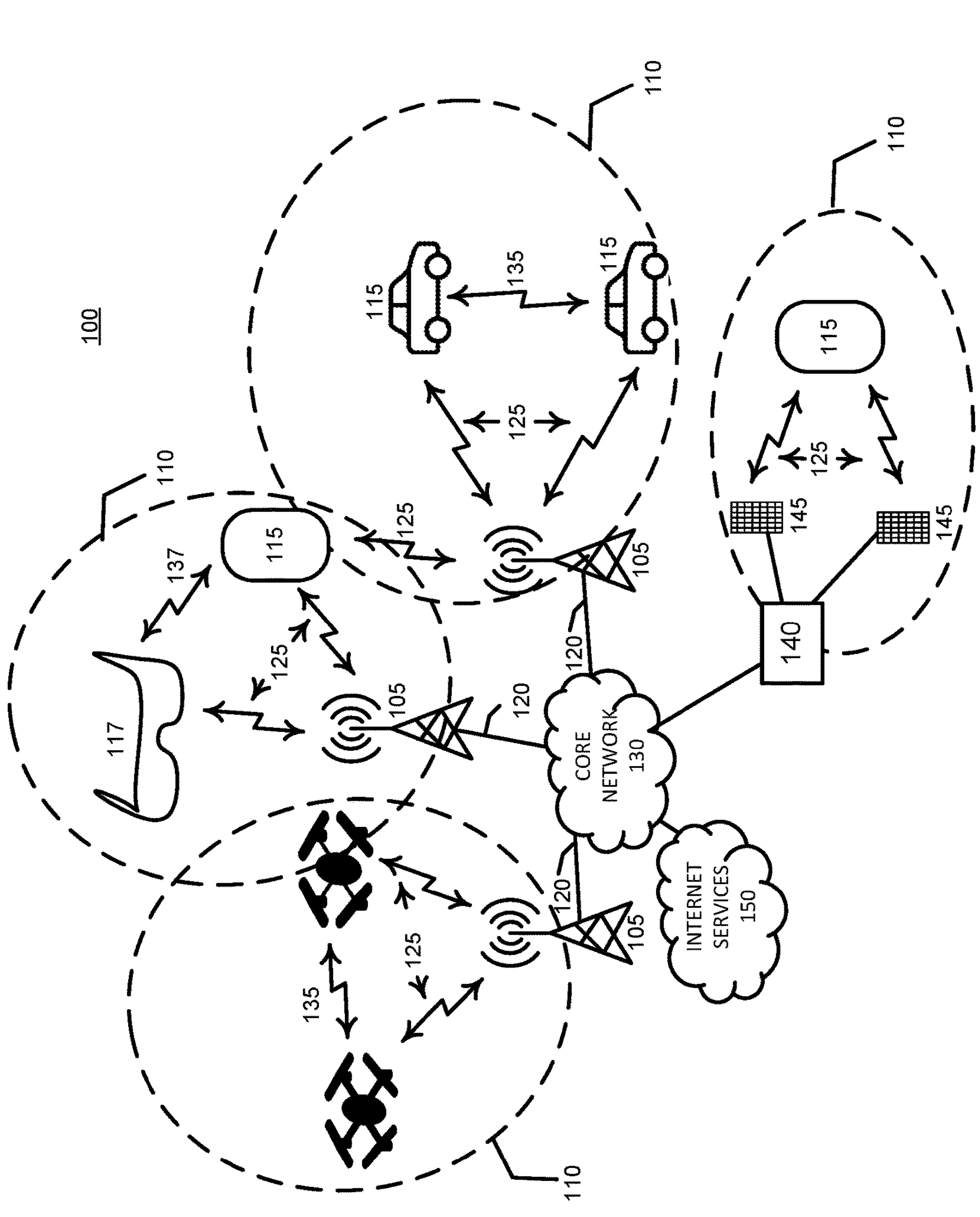
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors.

The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Multi-SIM ("MUSIM") User Equipment Devices

Multi-SIM 5G devices may be smartphones or tablets that can support multiple SIM cards to connect to different radio access networks operated by respective different mobile network operators. A multi-SIM user equipment may be able to switch between different carriers or data plans without having to physically swap SIM cards. In some implementations, if equipped with multiple radio chains, a multi-SIM device can increase data transfer speeds via simultaneous use of multiple radio chains according to different SIM profiles. A multi-SIM user equipment may be useful for people who travel frequently or who have different phone numbers for personal and professional use. Additionally, some multi-SIM devices offer advanced features such as dual-standby mode, which allows users to receive calls and messages on both SIM cards simultaneously. Overall, multi-SIM user equipment devices may facilitate flexibility and convenience for users who need to manage multiple phone numbers or data plans.

Conventional techniques that facilitate use of multi-SIM devices include Dual SIM Dual Standby ("DSDS") mode that may enable multiple SIM cards, or multiple SIM profiles to remain active and ready to receive calls or messages simultaneously. (A SIM profile may comprise profile information that is stored in a memory of a user equipment device instead of being stored in a hardware card or instead of being stored in a component attached to a circuit of the user equipment.) Multiple SIM profiles may be useful for users who use two phone numbers on the same device without having to manually switch between SIM profile information. In multi-SIM devices, timing gaps can occur when the device needs to switch between use of different SIM profile information for incoming calls or messages. Conventional techniques may comprise use of several timing gap implementations to facilitate multi-SIM devices remaining reachable on all active SIM cards.

MUSIM device popularity is progressively increasing due to its practicality and well needed use cases. Conventional techniques for use of MUSIM devices have considered device operations to be implementation specific. For example, conventionally, a MUSIM device may be assumed capable enough to simultaneously monitor and decode paging indications from multiple networks corresponding to multiple SIMs of the MUSIM, or to simultaneously establish an active session on a RAN network while monitoring idle mode paging indications for the other RAN networks. This typically means that a MUSIM user equipment needs a minimum device and radio capability of being equipped with multiple radio chains, resulting in MUSIM devices tending to be costly with respect to user equipment having a single radio chain, or single radio circuitry.

In some implementations, conventional techniques may support procedures that may facilitate low-capability MUSIM devices (e.g., a MUSIM with a single radio chain). For example, a single-chain user equipment may be configured with dynamic timing gaps to be used to switch between being in connected mode with different radio access networks. A MUSIM device may be configured with scheduling timing gaps to facilitate switching, during an active session with a radio access network A, and monitoring for paging notifications originating from a second radio access network B, during the gaps, (e.g., to facilitate receiving a call indication from network B while having an active session with network A). Thus, support of low capability MUSIM devices is enabled. However, existing MUSIM timing gap procedures are not energy efficient and are not suitable for latency critical traffic. Specifically, according to conventional techniques, MUSIM devices typically frequently switch from network A to network B, during configured timing gaps corresponding to network A, to monitor for, and decode, potential paging indications transmitted by network B. If there are no detected paging indication directed towards the MUSIM device, the MUSIM device simply switches back to network A to resume its active session with network A. In such case, the device switching delay, the inflicted timing gap (where traffic/session is halted with respect to network A), and associated battery consumption are unnecessarily wasted.

According to conventional techniques, regardless of device activity, MUSIM devices may monitor downlink channels from both primary and secondary RAN networks to capture, or receive, potential paging indications from any of the radio access networks that the multiple SIM profiles of a MUSUM may facilitate. This may facilitate a MUSIM device receiving incoming call indications (e.g., paging indications, or paging notifications) via resources corresponding to secondary network B while operating an active session with respect to primary network A. Therefore, timing gaps with respect to the primary network A are configured to facilitate MUSIM devices switching from primary network A to monitor downlink channel resources corresponding to secondary network B for capturing paging indications and incoming calls/traffic.

The timing gaps with respect to network A used to capture paging indications transmitted to a MUSIM according to profile information corresponding to the secondary network B are considered additional radio overhead and contribute to increasing traffic buffering delay with respect to primary network A (e.g., traffic arrivals at a RAN node corresponding to network A during a configured current timing gap are buffered until the current timing gap expires). Furthermore, frequent MUSIM device switching is energy inefficient and contributes to rapidly depleting a battery's charge at the MUSIM device. In case of frequent paging false alarms over network B, where a MUSIM device switches radio resources to monitor for paging notifications from network B and detects no paging indication destined for the MUSIM device, the timing gaps configured for the MUSIM device to monitor resources corresponding to secondary network B, and corresponding energy used to switch networks, are wasted.

According to embodiments disclosed herein, on-demand MUSIM device timing gap and switching techniques may facilitate overhead used for a MUSIM device to switch to monitoring resources corresponding to a secondary network only when the user equipment receives a paging notification, directed to the MUSIM device from a secondary network, that may be facilitated by a SIM profile of multiple SIM profiles corresponding to the MUSIM device and that is relayed to the MUSIM device by a primary network with which the MUSIM has a currently active communication session/connection.

Embodiments disclosed herein may facilitate avoiding unnecessary scheduling of timing gaps for MUSIM devices with respect to a primary network A, except when there is a certain paging indication directed to the MUSIM device and originated by a secondary network B. Thus, performance costs (e.g., switching delay, traffic buffering delay with respect to network A, and device energy consumption) are imposed only on an on-demand basis (e.g., when there is actually traffic to be delivered to the MUSIM device from a radio access network node corresponding to the secondary radio access network B). A MUSIM device may share MUSIM capability information corresponding to the MUSIM device with a radio access network node corresponding to primary radio access network A. Accordingly, the RAN node corresponding to network A may transmit a paging steering request towards other secondary radio access networks that are supported by the MUSIM active devices (e.g., radio access networks with which the MUSIM use equipment device may be configured via SIM profile information to communicate). A paging steering request may be shared by a primary radio access network node corresponding to a primary radio access network with a secondary radio access network node corresponding to secondary radio access network via backhaul communication links, for example, Xn/F1 interfaces. A paging steering request may comprise idle mode identifier(s) corresponding to MUSIM devices to be used for paging MUSIM device(s) by a secondary network. A secondary radio access network node may accept or reject a paging steering request with the primary radio access network node. Upon acceptance of a paging steering request, RAN nodes corresponding to a secondary network B may steer potential paging indications corresponding to one or more of the MUSIM device(s) corresponding to the one or more identifiers that may have been included in the paging steering request towards a RAN node corresponding to primary network A that has a currently established active communication session at least one MUSIM device indicated in a paging notification received from secondary network B. Upon receiving a steered/relayed/rerouted paging notification(s) from secondary network B, a RAN node corresponding to primary network A may relay the paging notification(s) towards the paged MUSIM device(s). A relayed paging notification may be transmitted via an existing device-specific control channel configured for an active MUSIM device to use with respect to primary network A. A relayed paging notification may be transmitted via a novel device-group control channel usable by active MUSIM devices. Thus, embodiments disclosed herein may facilitate support of low-capability MUSIM devices having a single radio chain while limiting resource and power usage associated with timing and buffering gaps to instances when there is a certain paging notification directed from a secondary network towards a MUSIM device. According to embodiments disclosed herein, novel downlink signaling procedures via a radio interface may facilitate a RAN node corresponding to a primary network A relay a paging notification, via radio interface resources corresponding to primary network A towards a MUSIM device, that originated at a RAN node corresponding to a secondary network B. Inter-operator signaling (e.g., signaling between radio access network nodes corresponding to different mobile network operators) may occur via a standardized interface to support paging notification/indication exchanges between radio access network node equipment manufactured by different equipment vendors. In centralized deployments, where processing core units supplied by multiple vendors may virtually run, or execute, on the same server, a software interface should be well supported and specified to relay paging indications from one network to another in an equipment-vendor-agnostic manner.

Inter Operator Paging Coordination for MUSIM Devices

Figure 2:
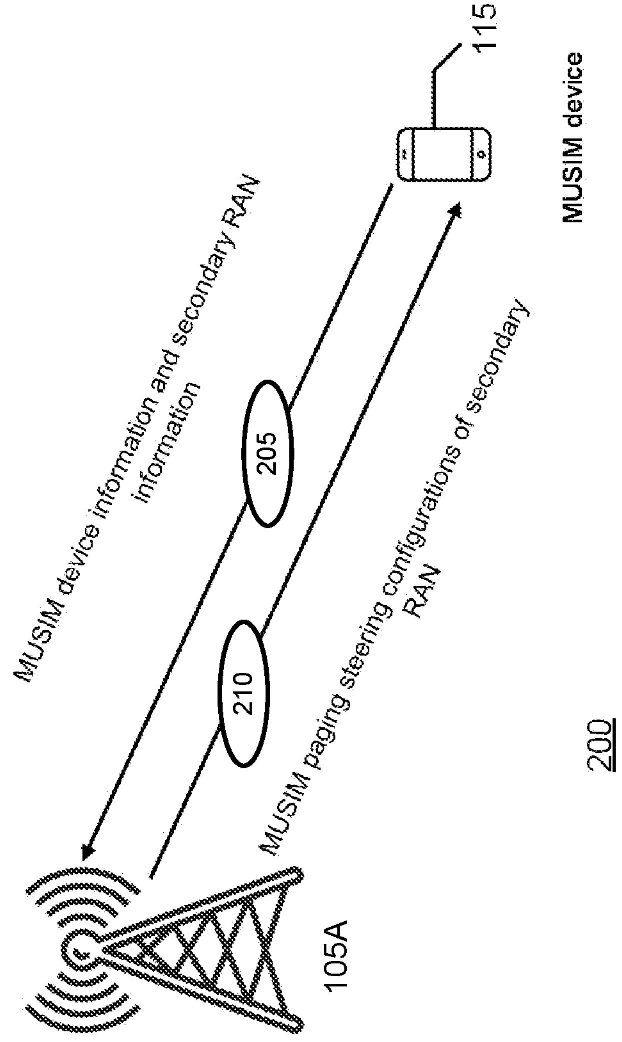
FIG. 2 illustrates an example environment with a multi-SIM user equipment and a radio access network node.

Turning now to FIG. 2, environment 200 comprises user equipment 115, which may comprise multiple subscriber identity modules that may be referred to as a multi-SIM UE ("MUSIM"), and primary radio access network node 105A. As depicted by FIG. 2, the MUSIM device 115, when establishing a connection towards a primary RAN node of network A, may share device and capability information via a capability indication 205. The information shared in capability indication 205 may comprise network identifiers corresponding to supported secondary RAN networks. The information shared in indication 205 may comprise MUSIM radio capability information in terms of a number of available radio chains. Accordingly, RAN node 105A of a primary network may configure MUSIM UE 115, via paging steering configuration 210, with a paging steering downlink control information format, according to which the MUSIM UE may monitor and potentially receive from RAN node 105A paging notifications originated by a radio access network node corresponding to a radio access network [on] other than a radio access network to which RAN node 105A corresponds. Paging steering configuration 210 may comprise information corresponding to a device-group-common control channel search space (e.g., a frequency resource or a timing resource) for transmitting, by RAN node 105A towards UE 115, paging notifications originated by a RAN node corresponding to a network other than a network to which RAN node 105A corresponds.

Figure 3:
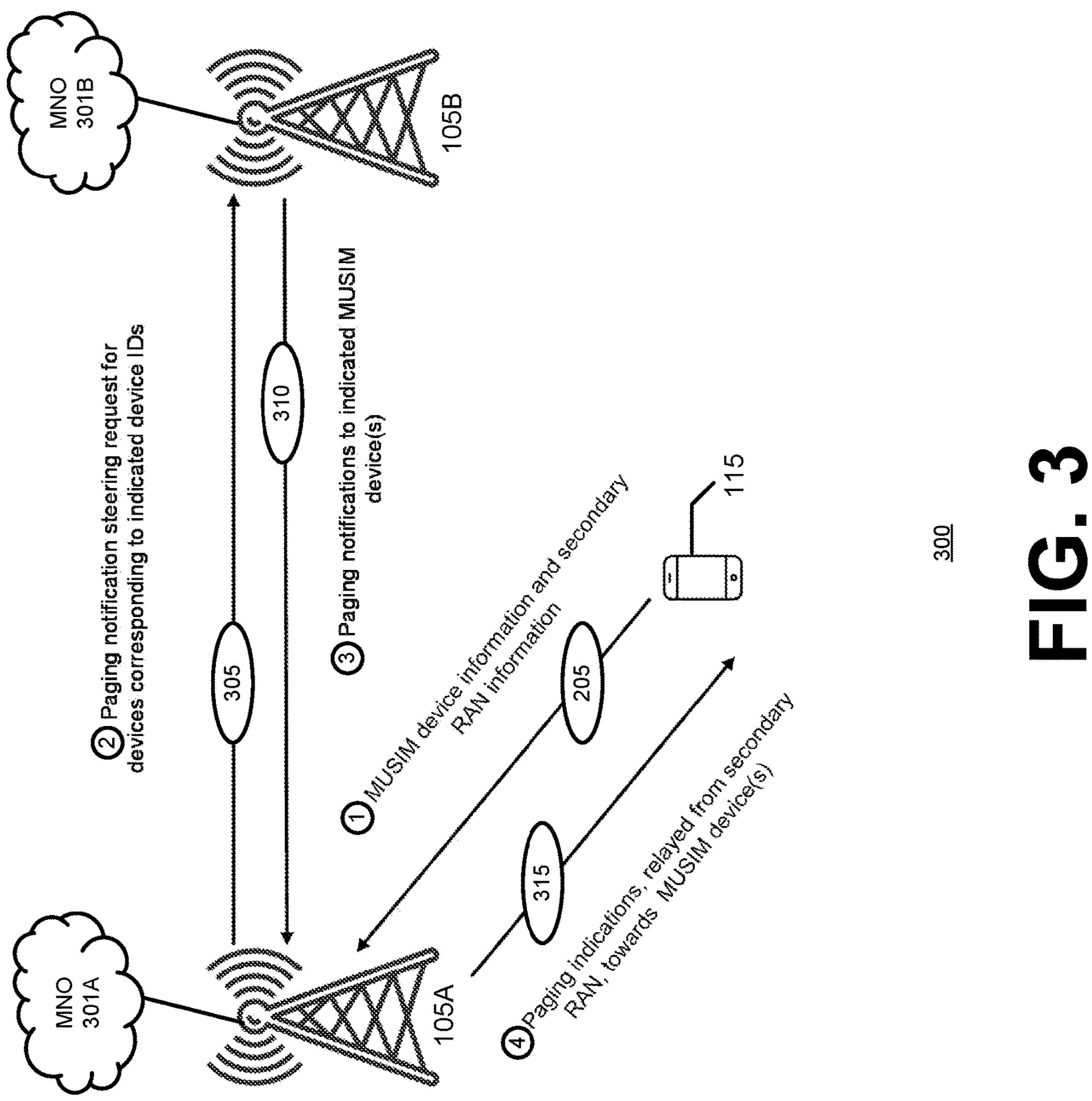
FIG. 3 illustrates an environment with paging to a multi-SIM user equipment being steered from one radio access network node to another radio access network node.

Turning now to FIG. 3, acts of an embodiment are shown with respect to environment 300, which comprises MUSIM user equipment 115, primary radio access network node 105A and secondary radio access network node 105B. At act 1, MUSIM device 115 may share its MUSIM radio capability and information toward RAN node 105A corresponding to primary network 301A. Primary RAN node 105A may transmit paging steering request 305 toward an access and mobility function ("AMF") corresponding to network 301B, or to a secondary RAN corresponding to network 301B at act 2. Paging steering request 305 may indicate a list of MUSIM device identifiers corresponding to user equipment for which paging steering is requested. Upon acceptance of the paging steering request by secondary RAN node 105B or an AMF corresponding thereto, primary RAN node 105A corresponding to network 301A may receive one or more paging steering notifications from one or more nodes corresponding to secondary networks, such as network 301B, indicating a MUSIM device identifier. A primary RAN node corresponding to network 301A may relay a received paging notification to an indicated active MUSIM devices, according to device-specific or device group common control channel signaling.

Embodiments disclosed herein may comprise multiple acts with respect to radio and backhaul interfaces. At act 1 shown in FIG. 3, MUSIM device 115 may establish a connection with a RAN node 105A corresponding to mobile network operator ("MNO") network 301A (e.g., a primary network with which the UE may operate most of the time, for example, a network associated with a business SIM profile during the daytime during a work week), and may share MUSIM device information including identifiers associated with secondary RAN networks (e.g., network 301B) facilitated by multiple SIM profiles and MUSIM radio capability (e.g., a number of MUSIM radio chains) with RAN 105A via capability indication 205. At act 2, RAN 105A may transmit a paging steering request 305 toward any of the RAN nodes corresponding to secondary radio access networks indicated in the capability indication 205 received from UE 115 (e.g., RAN 105A may transmit a paging steering request to secondary RAN 105B). RAN 105A may transmit a paging steering request 305 to an access and mobility function ("AMF") entity corresponding to network 301B. RAN 105A may transmit, via backhaul links, a paging steering request 305, towards a secondary RAN nodes/AMF corresponding to a secondary radio access network node indicated in the capability indication. Paging steering request 305 may comprise a list of MUSIM idle mode device identifiers corresponding to MUSIM devices for which paging notifications are to be steered, or relayed, by a radio access network node corresponding to network 301A (e.g., steered by RAN 105A). RAN node 105B, or an AMF, corresponding to network 301B, may accept paging steering request 305 for all or fewer than all MUSIM devices indicated in the paging steering request 305. At act 3, RAN 105B may transmit paging notification 310, directed to UE 115 and indicative of traffic available to UE 115 at RAN 105B, via backhaul links, to RAN 105A, or to an AMF corresponding to network 301A. RAN 105B may determine to transmit paging notification 310 to RAN 105A, which may have a currently active session with to-be-paged MUSIM device 115, for relaying thereby to UE 115, based on an identifier corresponding to UE 115 being in the paging steering request 305 transmitted at act 2. At act 4, primary RAN node 105A, upon receiving the steered paging indications/notifications from a secondary RAN node corresponding to network 301B, may relay paging notification 310, which may be referred to as a first paging notification, to MUSIM device 115 as second paging indication 315.

Relaying of a paging message from RAN 105B by RAN 105A may be facilitated by device-specific control channel signaling corresponding to a currently active/connected mode communication session between UE 115 and RAN 105A, and may be facilitated by adding new information elements regarding secondary paging notifications within conventional/existing downlink control channel messages. In an embodiment, relaying of a paging message from RAN 105B by RAN 105A to UE 115 may be part of a newly defined device-group-common control channel that only MUSIM devices that support paging steering can monitor and decode. At MUSIM UE 115, unlike conventional techniques, the MUSIM UE may minimize switching from monitoring network 301A to monitoring network 301B for paging notifications. Instead, UE 115 may just monitor a configured device-specific or device-group-control channel resource corresponding to primary network 301A. Upon detecting a steered paging indication 315, MUSIM UE 115, in an on-demand manner (e.g., on demand in the sense that the UE only monitors resources corresponding to RAN node 105B after receiving steered paging 310 as steered paging notification 315) may initiate switching to monitoring of resources corresponding to RAN node 105B to connect to the secondary network or to receive incoming call/data traffic. Thus, infliction of radio capability reduction or complete halting of traffic with respect to primary network 301A is reduced. (It will be appreciated that a MUSIM UE having a single RF chain halts, or puts on hold, a connection with a primary network until call/data traffic is received from the secondary network). Therefore, according to the embodiment shown in FIG. 3, MUSIM switching performance costs are only inflicted on-demand when needed.

Accordingly, MUSIM UE 115 may only monitor RAN nodes corresponding to primary network 301A, with which the UE is currently connected, to receive multiple paging indications of multiple different networks 301 (e.g., different networks associated with multiple SIM cards or multiple SIM profiles corresponding to the UE). Thus, UE 115 need not switch back and forth between networks unless a relayed, or steered, paging notification 315 indicates that there is traffic to be transmitted by RAN 105B to UE 115.

Illustrated in FIG. 4 is an example device-specific relayed paging indication message. FIG. 4 shows novel upgraded device specific control channel information ("DCI") signaling message 415. New information elements 415 may comprise secondary paging indications 420 indicative of a secondary RAN node which has traffic available to be delivered to a MUSIM UE. The MUSIM UE device may decode a downlink control channel resource according to a configuration received from a primary RAN node to extract secondary paging notification 420.

As shown by FIG. 5, in case a primary RAN node 115A of a corresponding primary network A configured a MUSIM UE to monitor a group common control channel resource to receive secondary paging indications, the group common control channel resource may carry secondary paging indications 525-1-525-*n*, that may make up a list of secondary paging indications 515, where each secondary paging indication 525, which may be a value, string, or function, may be associated in list 515 with a MUSIM device identifier corresponding to a MUSIM UE that may be being paged by a secondary RAN node and a secondary RAN network identifier corresponding to the paging secondary RAN node. In an embodiment, the MUSIM identifiers may comprise mask identifiers to conceal a real, or actual, identifier, such as an IMSI, associated with one MUSIM identifiers in list 515 from another MUSIM identified in list 515. In an embodiment, mask identifiers may facilitate concealing real, or actual, identifiers from the primary radio access network node.

Figure 6:
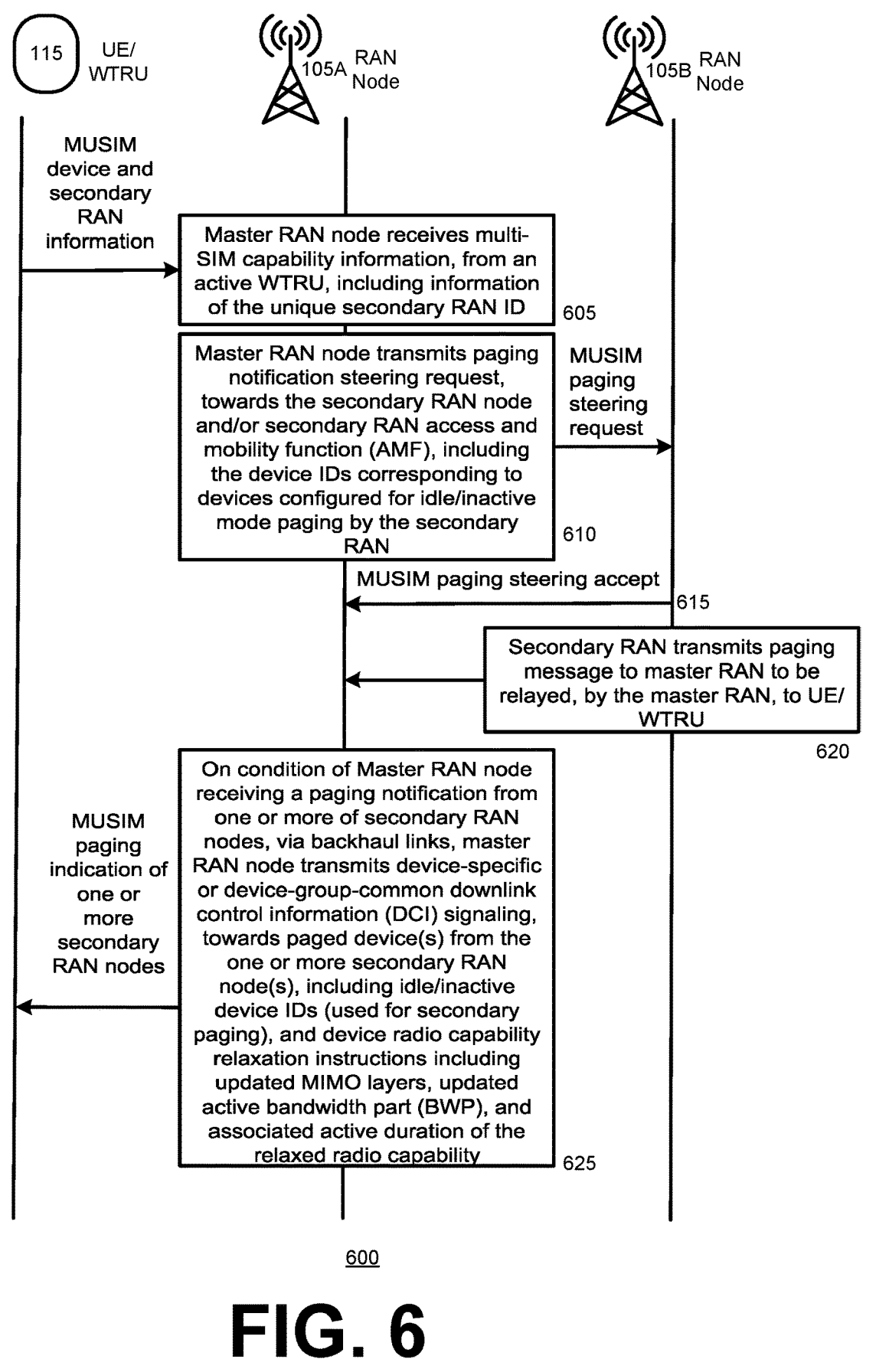

Turning now to FIG. 6, the figure illustrates a timing diagram of an example method 600. At act 605, primary, or master, RAN node 105A may receive multi-SIM capability information, from an active UE/WTRU 115, including information corresponding to secondary RAN 105B. At act 610, primary RAN node 105A may transmit a paging notification steering request towards secondary RAN node 105B and/or to a secondary RAN access and mobility function (AMF). The steering request may comprise device identifiers corresponding to user equipment for which idle/inactive mode paging may be facilitated. At act 615, secondary RAN node 105B may transmit to primary RAN node 105A a paging steering acceptance.

On condition of primary RAN node 105A receiving, at act 620, a first paging notification, or a first paging message, from secondary RAN node 105B, for example via backhaul links, the primary RAN node may transmit at act 625 a device-specific message, or a device-group-common downlink control information signaling message, towards device(s) paged by secondary RAN node 105B. The message transmitted at act 625 may be a DCI message. The message transmitted at act 625 may be referred to as a second paging notification, or a second paging message. The first paging notification may comprise idle/inactive device identifiers to be used for secondary paging, which may be mask identifiers that mask a real identifier corresponding to the one or more paged user equipment, including UE 115. The second paging notification may comprise actual, or real, identifiers, corresponding to user equipment devices being paged by secondary RAN 105B. The second paging notification may comprise device radio capability relaxation instructions including updated MIMO layer information, updated active bandwidth part information, and a duration during which the relaxation of radio capability may be implemented.

Figure 7:
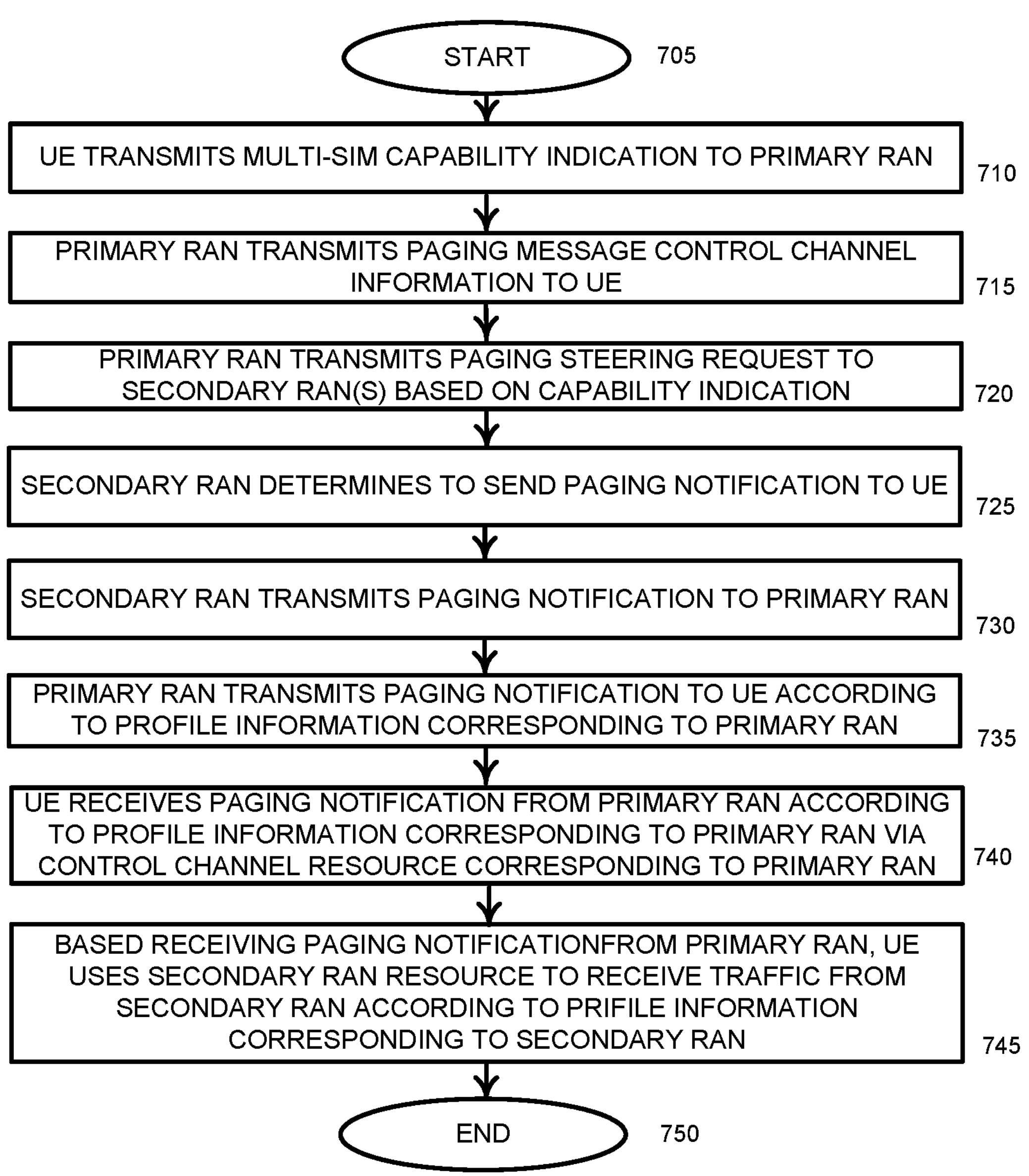
FIG. 7 illustrates a flow diagram of an example method of inter-operator paging steering.

Turning now to FIG. 7, the figure illustrates a flow diagram of an example method 700. Method 700 begins at act 705. At act 710, a user equipment having multi-SIM profiles, or being configured with multiple SIM profile information, may transmit to a radio access network node to which the user equipment may have an established communication session (the radio access network node may be referred to as a primary radio access network node), a multi-SIM capability indication indicative of the multiple subscriber identity module profiles configured into the user equipment to facilitate communication with radio access network nodes corresponding to respective multiple different radio access networks. The multiple subscriber identity module profiles may be facilitated by respective multiple subscriber identity module cards, multiple subscriber identity electronic subscriber identity modules (e.g., multiple e-SIMs), or may comprise profile information that is stored as data in a memory of the user equipment instead of being included in a hardware card or being included in a hardware component that may part of the user equipment.

At act 715, the primary radio access network node may transmit paging message control channel information to the user equipment. The paging message control channel information may comprise information usable by the user equipment to obtain via a resource (e.g., a timing or frequency resource), from the primary radio access network node, a paging notification that may have been transmitted by a secondary radio access network node, which may correspond to a network that is associated with one of the multiple subscriber identity module profiles, or multiple subscriber identity modules profile information, other than a network with which the primary radio access network node is associated.

At act 720, the primary radio access network node may transmit a paging steering request to one or more secondary radio access network nodes. The primary radio access network node may transmit the paging steering request to the one or more secondary radio access network nodes based on information contained in the multi-SIM capability indication transmitted by the user equipment to the primary radio access network node at act 710. For example, the multi-SIM capability indication may comprise information indicative of one or more secondary radio access networks corresponding to the one or more secondary radio access network nodes. Accordingly, the primary radio access network node may transmit paging steering requests to one or more secondary radio access network nodes, corresponding to the one or more secondary radio access networks, that are likely within radio range of the user equipment, for example. The paging steering requests may be transmitted to the one or more secondary radio access network nodes via backhaul communication links.

At act 725, a secondary radio access network node may determine to send a paging notification to the user equipment. For example, the secondary radio access network node, with respect to which the user equipment may be in an idle mode because it has a single radio chain (e.g., radio circuitry that facilitates communicating with one radio access network at a given time), may not have an active communication session corresponding to the user equipment because the user equipment may be using SIM profile information corresponding to the primary radio access network node for an active communication session with the primary radio access network node. Accordingly, at act 730, based on having accepted the paging steering request transmitted by the primary radio access network node at act 720, the secondary radio access network node may transmit the paging notification determined at act 725 to the primary radio access network node. The secondary radio access network node may transmit the paging notification to the primary radio access network node via backhaul communication links.

At act 735, the primary radio access network node may transmit the paging notification received via backhaul links from the secondary radio access network node to the user equipment according to SIM profile information corresponding to the primary radio access network node. Thus, the user equipment does not need to use its radio chain circuitry, or SIM profile information corresponding to the second radio access network node, to receive the paging notification transmitted by the second radio access network node. At act 740, the user equipment may receive the paging notification from the primary radio access network node according to SIM profile information corresponding to the primary radio access network node. The user equipment may receive the paging notification from the primary radio access network node via a control channel resource corresponding to the primary radio access network node. In an embodiment, the control channel resource may be a resource usable by the user equipment to receive paging notifications, corresponding to the primary radio access network node, from the primary radio access network node. In an embodiment, the control channel resource may be a resource usable by the user equipment specifically configured to receive paging notifications corresponding to secondary radio access network nodes relayed by the primary radio access network node to the user equipment. At act 745, based on having received the paging notification, originated by the secondary radio access network node, from the primary radio access network node, the user equipment may adjust its radio circuitry to obtain from the secondary radio access network node one or more messages, or traffic, from the secondary radio access network node according to profile information corresponding to the secondary radio access network node. The message(s)/traffic may comprise, for example, a voice call, video traffic, a text message, an e-mail message, or other data traffic. Method 700 advances to act 750 and ends.

Turning now to FIG. 8, the figure illustrates an example embodiment method 800 comprising at block 805 facilitating, by a first radio access network node comprising a processor, receiving, from a user equipment comprising first subscriber identity module profile information and second subscriber identity module profile information, a capability indication indicative of the first subscriber identity module profile information and the second subscriber identity module profile information; at block 810 facilitating, by the first radio access network node, transmitting, to a second radio access network node, a paging steering request message indicative to the second radio access network node to notify the first radio access network node that messages are available to be transmitted by the second radio access network node to the user equipment according to the second subscriber identity module profile information; at block 815 facilitating, by the first radio access network node, receiving, from the second radio access network node, a first paging notification indicative of at least one message to be transmitted by the second radio access network node to the user equipment; and at block 820 facilitating, by the first radio access network node, transmitting, to the user equipment according to the first subscriber identity module profile information, a second paging notification indicative of the at least one message to be transmitted by the second radio access network node to the user equipment.

Turning now to FIG. 9, the figure illustrates a first radio access network node 900, comprising at block 905 a processor configured to receive, from a second radio access network node, a paging steering request indicative to the first radio access network node to notify the second radio access network node of paging messages available to be transmitted, by the first radio access network node to a user equipment that comprises first subscriber identity module profile information corresponding to the first radio access network node and second subscriber identity module profile information corresponding to the second radio access network node; and at block 910 based on the paging steering request, transmit, to the second radio access network node, a paging notification indicative of a message to be transmitted to the user equipment.

Figure 10:
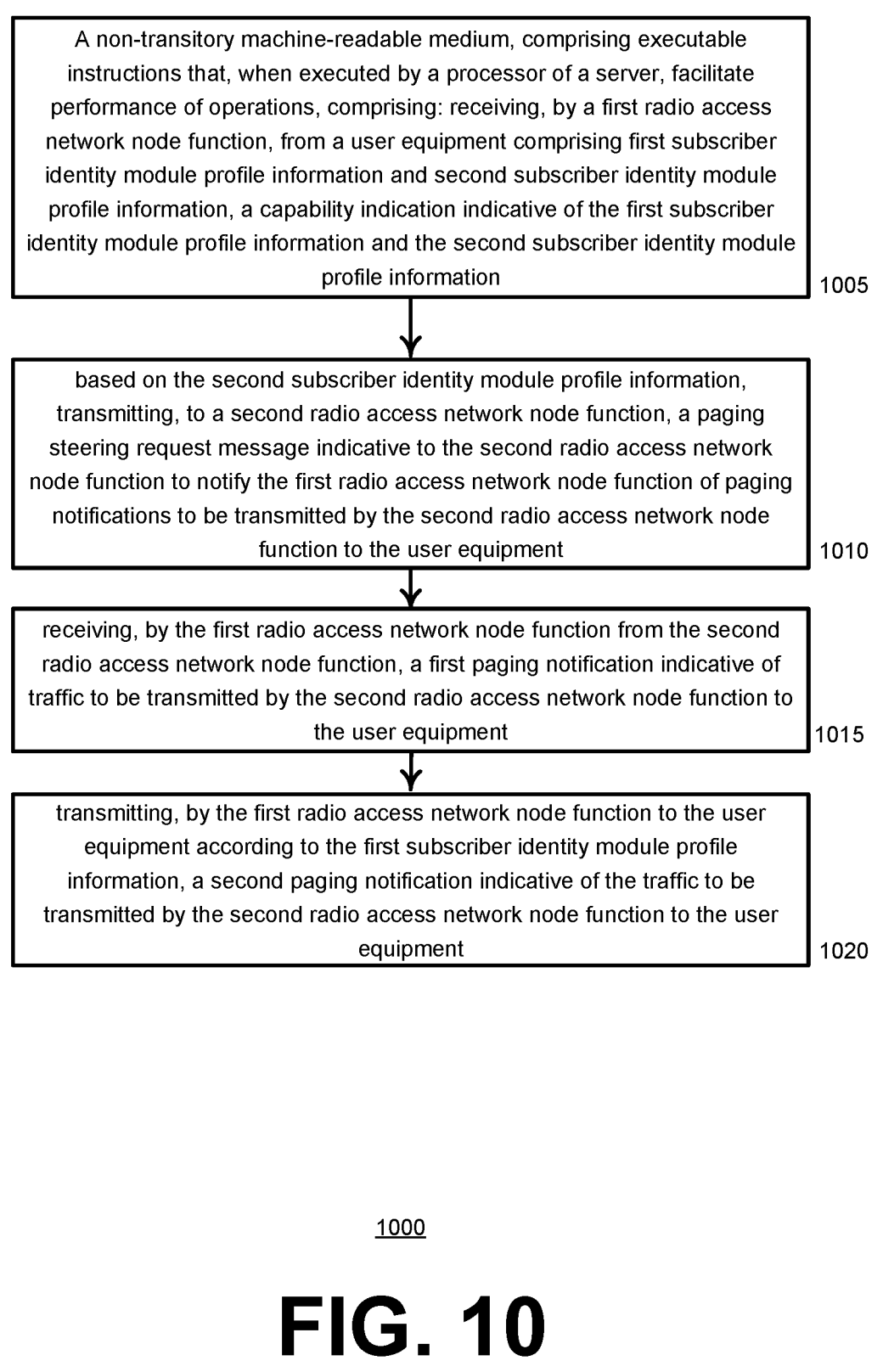

Turning now to FIG. 10, the figure illustrates a non-transitory machine-readable medium 1000 comprising at block 1005 executable instructions that, when executed by a processor of a server, facilitate performance of operations, comprising receiving, by a first radio access network node function, from a user equipment comprising first subscriber identity module profile information and second subscriber identity module profile information, a capability indication indicative of the first subscriber identity module profile information and the second subscriber identity module profile information; at block 1010 based on the second subscriber identity module profile information, transmitting, to a second radio access network node function, a paging steering request message indicative to the second radio access network node function to notify the first radio access network node function of paging notifications to be transmitted by the second radio access network node function to the user equipment; at block 1015 receiving, by the first radio access network node function from the second radio access network node function, a first paging notification indicative of traffic to be transmitted by the second radio access network node function to the user equipment; and at block 1020 transmitting, by the first radio access network node function to the user equipment according to the first subscriber identity module profile information, a second paging notification indicative of the traffic to be transmitted by the second radio access network node function to the user equipment.

Figure 11:
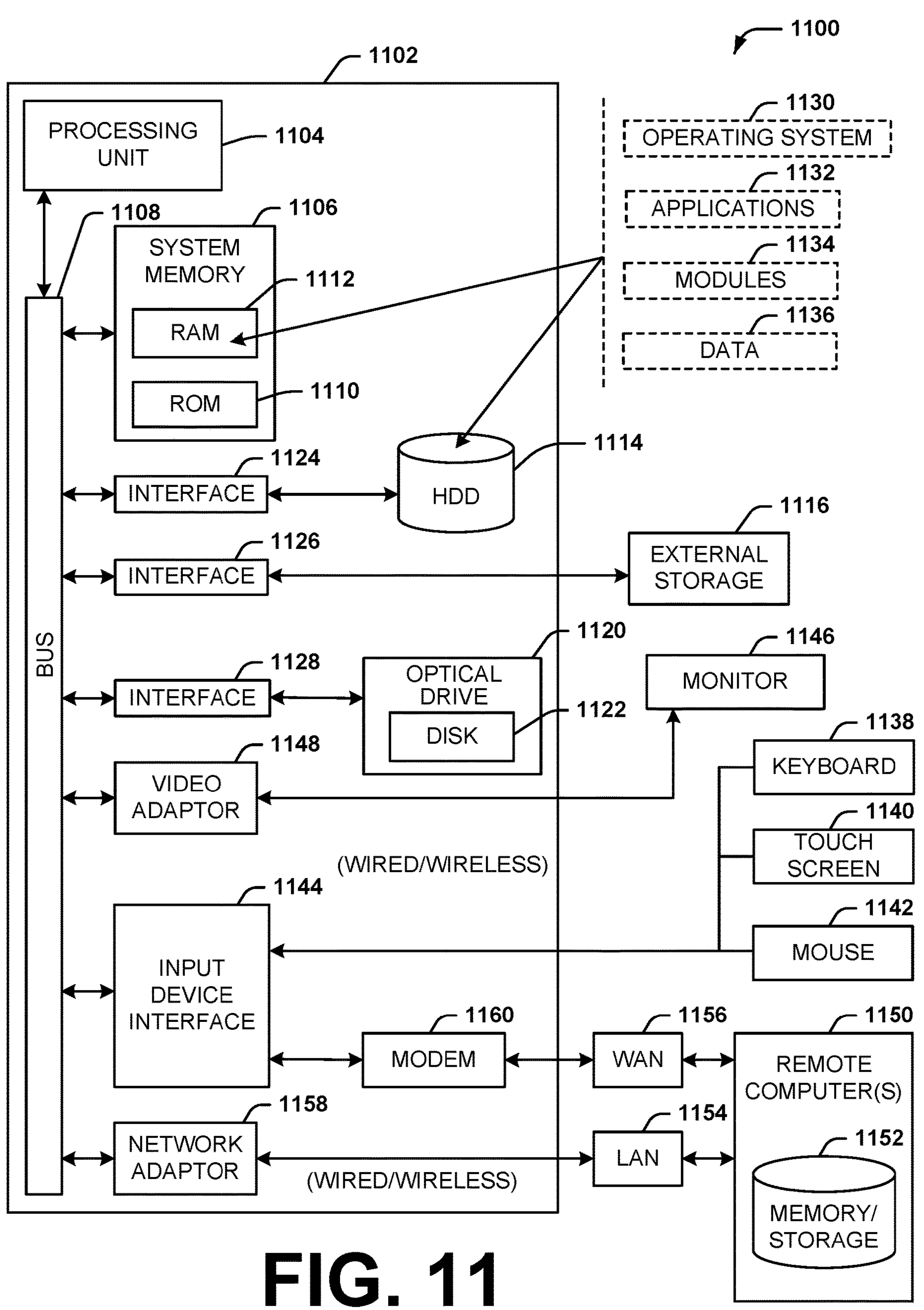
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sec.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
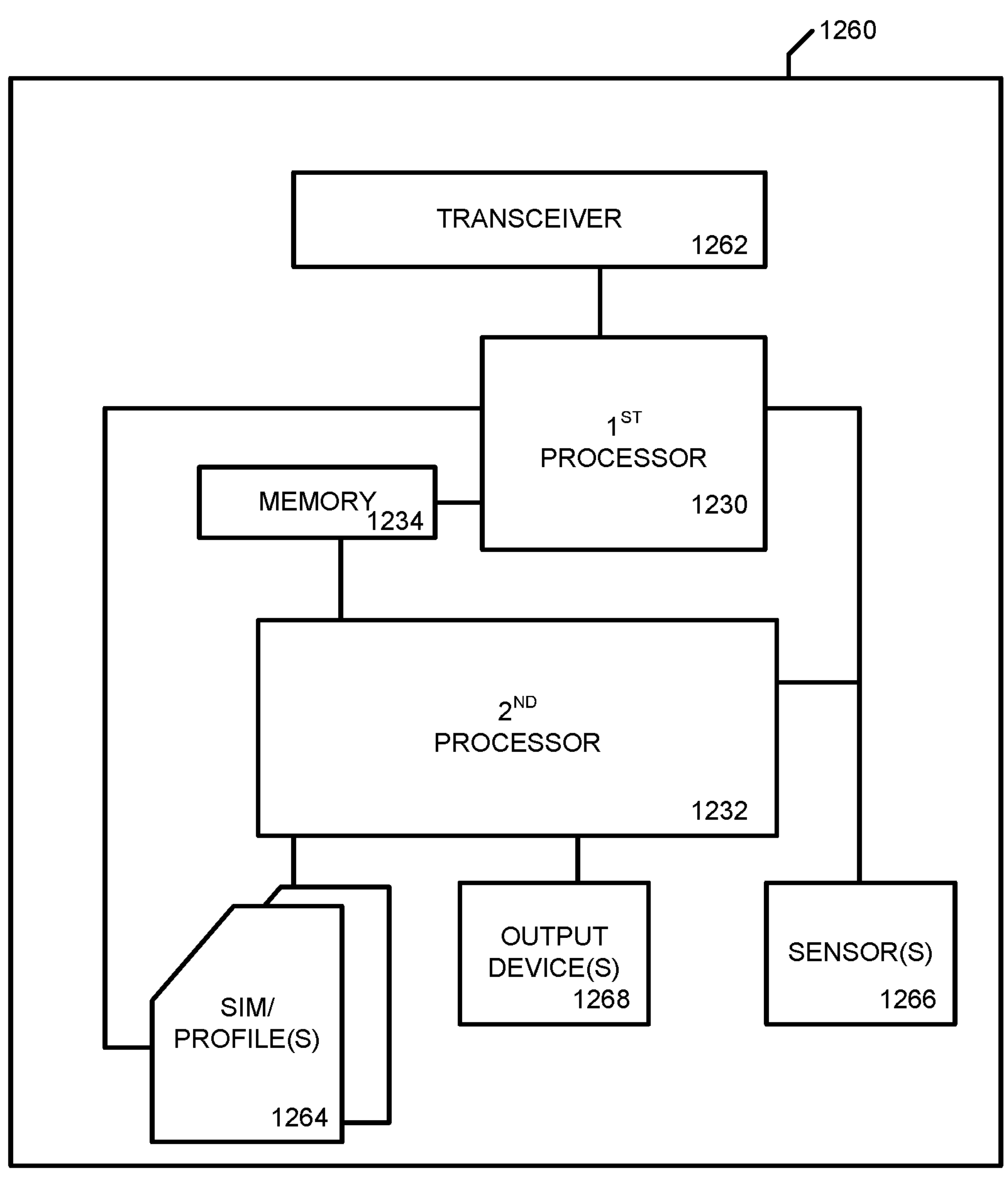
FIG. 12 illustrates a block diagram of an example wireless UE.

Turning to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, a tracking device, remote sensing devices, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as multiple components in the shape of a conventional SIM card. It will be appreciated that SIM 1264 may represent multiple SIM cards or a single SIM card, multiple SIM profiles or a single SIM profile, or multiple eSIMs or a single eSIM, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or a baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |

TABLE 1-continued

| Term | Definition |
|---|---|
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a first radio access network node comprising at least one processor from a user equipment comprising first subscriber identity module profile information and second subscriber identity module profile information, a capability indication indicative of the first subscriber identity module profile information and the second subscriber identity module profile information;

transmitting, by the first radio access network node to a second radio access network node, a paging steering request message to indicate to the second radio access network node to notify the first radio access network node that messages are available to be transmitted by the second radio access network node to the user equipment according to the second subscriber identity module profile information;

transmitting, to the user equipment, timing gap information corresponding to at least one timing gap usable by the user equipment to receive messages from the second radio access network node according to the second subscriber identity module profile information;

receiving, by the first radio access network node from the second radio access network node, a first paging notification indicative of at least one message to be transmitted by the second radio access network node to the user equipment; and transmitting, by the first radio access network node to the user equipment according to the first subscriber identity module profile information, a second paging notification indicative of the at least one message to be transmitted by the second radio access network node to the user equipment during at least one of the at least one timing gap, wherein scheduling, by the first radio access network node, at least one network resource, corresponding to the first radio access network node and corresponding to the first subscriber identity module, to be usable by the user equipment during the at least one timing gap, is avoided.

2. The method of claim 1, further comprising:

scheduling, by the first radio access network node, first network resources usable by the user equipment during at least one of the at least one timing gap for traffic transmission between the first radio access network node and the user equipment according to the first subscriber identity module profile information.

3. The method of claim 1, wherein the second paging notification comprises a timing gap change indication indicative to the user equipment to monitor, during a next available timing gap of the at least one timing gap, a paging resource corresponding to the second radio access network node according to the second subscriber identity module profile information.

4. The method of claim 3, further comprising:

avoiding, by the first radio access network node, scheduling first network resources to be usable by the user equipment during at least the next available timing gap of the at least one of the at least one timing gap for traffic transmission between the first radio access network node and the user equipment according to the first subscriber identity module profile information.

5. The method of claim 1, wherein the second paging notification is transmitted to the user equipment via a resource corresponding to the first radio access network node that is specified to be usable only by the user equipment.

6. The method of claim 1, wherein the user equipment is a member of a group of user equipment, wherein the second paging notification is transmitted via a resource corresponding to the first radio access network node that is specified to be usable by at least two user equipment of the group of user equipment, and wherein the second paging notification comprises at least two user equipment identifiers respectively corresponding to the at least two user equipment.

7. The method of claim 6, wherein the at least two user equipment identifiers comprise mask identifiers that are associated with at least two true user equipment identifiers respectively corresponding to the at least two user equipment, and wherein the at least two true user equipment identifiers are hidden from the first radio access network node.

8. The method of claim 1, wherein the second paging notification comprises at least one radio capability relaxation instruction that comprises at least one of: at least one multiple-input multiple-output information indication, at least one updated bandwidth part information indication, and at least one duration indication indicative of at least one duration during which relaxation of radio capability is to be implemented.

9. A first radio access network node, comprising:

a processor configured to:

receive, from a second radio access network node, a paging steering request that indicates to the first radio access network node to notify the second radio access network node of paging messages available to be transmitted, by the first radio access network node to a user equipment that comprises first subscriber identity module profile information corresponding to the first radio access network node and second subscriber identity module profile information corresponding to the second radio access network node;

based on the paging steering request, transmit, to the second radio access network node, a paging notification indicative of a paging message to be transmitted to the user equipment by the first radio access network node; and transmitting the paging message to the user equipment during at least one timing gap, wherein scheduling, by the second radio access network node, at least one network resource, corresponding to the second radio access network node and corresponding to the second subscriber identity module, to be usable by the user equipment during the at least one timing gap, is avoided.

10. The first radio access network node of claim 9, wherein the user equipment is a first user equipment of a set of user equipment, wherein the paging steering request comprises a first user equipment identifier corresponding to the first user equipment and a second user equipment identifier corresponding to a second user equipment of the set of user equipment, wherein the first user equipment identifier and the second user equipment identifier in the paging steering request indicate to the first radio access network node to notify the second radio access network node of paging messages available to be transmitted to the first user equipment or the second user equipment, respectively, and wherein the processor is further configured to:

accept the paging steering request with respect to the first user equipment; and deny the paging steering request with respect to the second user equipment to result in a denied paging steering request.

11. The first radio access network node of claim 10, wherein the denied paging steering request is based on at least one of: the second user equipment failing to have an active subscription, with respect to the first radio access network node, to a paging steering service; the second user equipment being associated with a privacy level; or a policy requirement that the second user equipment monitor paging resources corresponding to the first radio access network node to receive paging messages according to the first subscriber identity module profile information.

12. The first radio access network node of claim 9, wherein the paging steering request comprises a mask user equipment identifier, corresponding to the user equipment, that indicates to the first radio access network node to notify the second radio access network node of paging messages available to be transmitted to the user equipment via the paging notification, wherein the paging comprises the mask user equipment identifier, and wherein the paging message comprises a non-mask user equipment identifier corresponding to the user equipment.

13. A non-transitory machine-readable medium, comprising executable instructions that, when executed by at least one processor of a server, facilitate performance of operations, comprising:

receiving, by a first radio access network node function from a user equipment comprising first subscriber identity module profile information and second subscriber identity module profile information, a capability indication that indicates the first subscriber identity module profile information and the second subscriber identity module profile information;

based on the second subscriber identity module profile information, transmitting, to a second radio access network node function, a paging steering request message to indicate to the second radio access network node function to notify the first radio access network node function of paging notifications to be transmitted by the second radio access network node function to the user equipment;

transmitting timing gap information corresponding to at least one timing gap usable by the user equipment to receive traffic from the second radio access network node according to the second subscriber identity module profile information;

receiving, by the first radio access network node function from the second radio access network node function, a first paging notification that indicates traffic to be transmitted by the second radio access network node function to the user equipment; and transmitting, by the first radio access network node function to the user equipment according to the first subscriber identity module profile information, a second paging notification that indicates that the traffic is to be transmitted by the second radio access network node function to the user equipment during the at least one timing gap, wherein scheduling, by the first radio access network node, at least one network resource, corresponding to the first radio access network node and corresponding to the first subscriber identity module, to be usable by the user equipment during the at least one timing gap, is avoided.

14. The non-transitory machine-readable medium of claim 13, wherein the second paging notification comprises a timing gap change indication to indicate to the user equipment to monitor, during a next available timing gap of the at least one timing gap, a second network resource corresponding to the second radio access network node according to the second subscriber identity module profile information.

15. The non-transitory machine-readable medium of claim 14, wherein the next available timing gap occurs after the first paging notification is received from the second radio access network node function.

16. The non-transitory machine-readable medium of claim 15, the operations further comprising:

avoiding, by the first radio access network node function, scheduling the first network resource to be usable by the user equipment during at least the next available timing gap of the at least one of the at least one timing gap for traffic transmission between the first radio access network node and the user equipment according to the first subscriber identity module profile information.

17. The non-transitory machine-readable medium of claim 13, wherein the first radio access network node function corresponds to a first radio access network, and wherein the second radio access network node function corresponds to a second radio access network.

18. The non-transitory machine-readable medium of claim 17, wherein the first radio access network corresponds to a first network operator, wherein the second radio access network corresponds to a second network operator, and wherein the first network operator and the second network operator are different.

19. The non-transitory machine-readable medium of claim 13, wherein the second paging notification comprises at least one radio capability relaxation instruction that comprises at least one of: at least one multiple-input multiple-output information indication, at least one updated bandwidth part information indication, and at least one duration indication indicative of at least one duration during which relaxation of radio capability is to be implemented.

20. The non-transitory machine-readable medium of claim 19, wherein the at least one radio capability relaxation instruction is usable by the user equipment to receive traffic to be transmitted by the second radio access network node to the user equipment.

* * * * *